US010133358B1

United States Patent
Chen et al.

(10) Patent No.: US 10,133,358 B1
(45) Date of Patent: Nov. 20, 2018

(54) FITTING DETECTION FOR A BONE CONDUCTION TRANSDUCER (BCT) USING AN INERTIAL MEASUREMENT UNIT (IMU) SENSOR

(71) Applicant: GOOGLE LLC, Mountain View, CA (US)

(72) Inventors: Zhe Chen, Mountain View, CA (US); David Sparks, Mountain View, CA (US)

(73) Assignee: Google LLC, Mountain View, CA (US)

( * ) Notice: Subject to any disclaimer, the term of this patent is extended or adjusted under 35 U.S.C. 154(b) by 90 days.

(21) Appl. No.: 15/170,087

(22) Filed: Jun. 1, 2016

(51) Int. Cl.
| | |
|---|---|
| *G06F 3/01* | (2006.01) |
| *H04R 29/00* | (2006.01) |
| *H04R 3/04* | (2006.01) |
| *G06F 1/16* | (2006.01) |
| *G02B 27/01* | (2006.01) |

(52) U.S. Cl.
CPC ........ *G06F 3/017* (2013.01); *G02B 27/0176* (2013.01); *G06F 1/163* (2013.01); *H04R 3/04* (2013.01); *H04R 29/001* (2013.01); *H04R 2460/13* (2013.01)

(58) Field of Classification Search
None
See application file for complete search history.

(56) References Cited

U.S. PATENT DOCUMENTS

| | | | |
|---|---|---|---|
| 8,223,983 B2 | 7/2012 | Hakansson et al. | |
| 8,963,806 B1 * | 2/2015 | Starner | G02B 27/0093 345/7 |
| 2017/0127167 A1 * | 5/2017 | Zheng | H04R 1/1008 |

OTHER PUBLICATIONS

Kim Chol Jun, "Objective Measurements of Skull Vibration During Bone Conduction Audiometry", Inaugural-Dissertation for the requirement of the degree doctor of medicine in medical faculty of Zurich University, 2009.

* cited by examiner

*Primary Examiner* — Duane N Taylor, Jr.
(74) *Attorney, Agent, or Firm* — McDonnell Boehnen Hulbert & Berghoff LLP

(57) ABSTRACT

An example system is described that includes a head-mountable device (HMD) with a bone conduction transducer that transmits an audio signal and an inertial measurement unit (IMU) sensor connected to the bone conduction transducer. The IMU sensor detects movement of the HMD due to vibrations of the bone conduction transducer transmitting the audio signal and the IMU sensor provides outputs. The system also includes one or more processors that receive the outputs of the IMU sensor and compare the outputs of the IMU sensor with at least one reference signal. The at least one reference signal is based on the audio signal that is transmitted. The one or more processors output an HMD fitting parameter based on the comparison.

20 Claims, 8 Drawing Sheets

FITTING DETECTION FOR A BONE CONDUCTION TRANSDUCER (BCT) USING AN INERTIAL MEASUREMENT UNIT (IMU) SENSOR

BACKGROUND

Wearable computing devices are becoming increasingly popular. For example, head-mountable display devices, smart watches, body-worn health monitors, and smart headphones or headsets, are becoming increasingly common.

Users or wearers of the wearable computing devices may wear the devices differently due to a preferred fit or due to size of the devices and size of the users. Each wearable computing device can have an optimal fitting to provide optimal usage or optimal display, audio, etc., and determining the optimal fitting can be difficult.

SUMMARY

In one example, a system is described that comprises a head-mountable device (HMD) including a bone conduction transducer that transmits an audio signal and an inertial measurement unit (IMU) sensor connected to the bone conduction transducer. The IMU sensor detects movement of the HMD due to vibrations of the bone conduction transducer transmitting the audio signal and the IMU sensor provides outputs. The system also comprises one or more processors that receive the outputs of the IMU sensor and compare the outputs of the IMU sensor with at least one reference signal, and the at least one reference signal is based on the audio signal that is transmitted. The one or more processors output an HMD fitting parameter based on the comparison.

In another example, a system is described that comprises a head-mountable device (HMD) including a bone conduction transducer that transmits an audio signal and an accelerometer connected to the bone conduction transducer. The accelerometer detects movement of the HMD due to vibrations of the bone conduction transducer transmitting the audio signal and the accelerometer provides outputs. The system also comprises one or more processors that receive the outputs of the accelerometer and compare the outputs of the accelerometer with at least one reference signal, and the at least one reference signal is based on the audio signal that is transmitted. The one or more processors output an indication of a fit of the HMD to a wearer of the HMD based on the comparison.

In a further example, a method is described that comprises transmitting an audio signal via a bone conduction transducer of a head-mountable device (HMD), and detecting movement of the HMD, by an accelerometer connected to the bone conduction transducer, due to vibrations of the bone conduction transducer transmitting the audio signal. The method also comprises comparing outputs of the accelerometer with at least one reference signal, and the at least one reference signal is based on the audio signal that is transmitted. The method also comprises outputting an indication of a fit of the HMD to a wearer of the HMD based on the comparison.

These as well as other aspects, advantages, and alternatives, will become apparent to those of ordinary skill in the art by reading the following detailed description, with reference where appropriate to the accompanying drawings.

DETAILED DESCRIPTION

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Example systems described include a head-mountable device (HMD) with a bone conduction transducer (BCT) that transmits an audio signal and an inertial measurement unit (IMU) sensor connected to the BCT. The IMU sensor detects movement of the HMD due to vibrations of the BCT transmitting the audio signal and the IMU sensor provides outputs. The systems include one or more processors that receive the outputs of the IMU sensor and compare the outputs of the IMU sensor with at least one reference signal to output an HMD fitting parameter based on the comparison.

An exemplary embodiment may be implemented in a wearable computing device that facilitates voice-based user interactions. However, embodiments related to wearable devices that do not facilitate voice-based user interactions are also possible. An illustrative wearable device may include an ear-piece with a bone-conduction speaker (e.g., a bone conduction transducer or "BCT"). A BCT may be operable to vibrate the wearer's bone structure at a location where the vibrations travel through the wearer's bone structure to the middle ear, such that the brain interprets the vibrations as sounds. The wearable device may take the form of an earpiece with a BCT, which can be tethered via a wired or wireless interface to a user's phone, or may be a stand-alone earpiece device with a BCT. Alternatively, the wearable device may be a glasses-style wearable device that includes one or more BCTs and has a form factor that is similar to traditional eyeglasses.

Figure 1A:
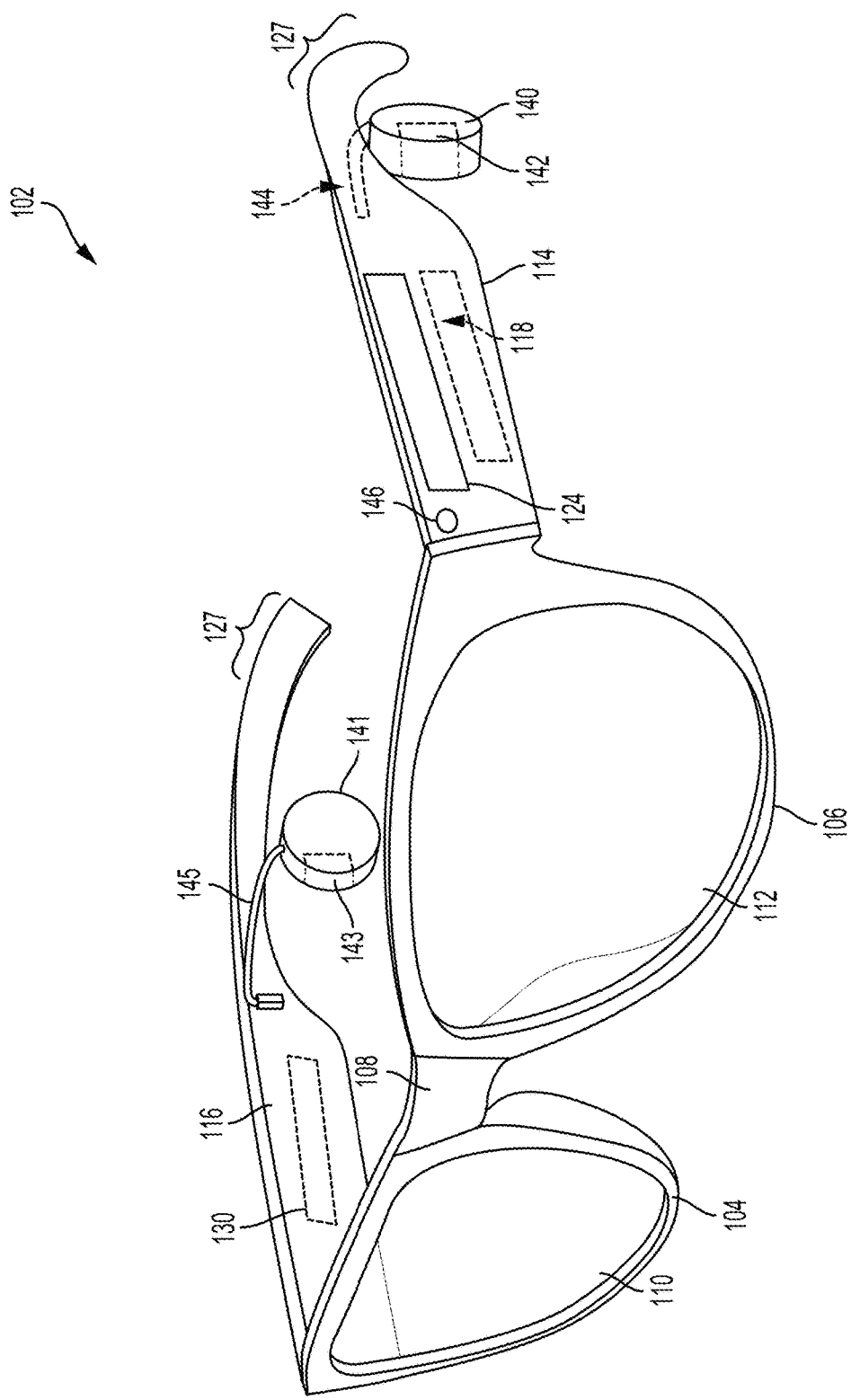
FIG. 1A illustrates a wearable computing device, according to an example embodiment.

FIG. 1A illustrates a wearable computing device 102, according to an exemplary embodiment. In FIG. 1A, the wearable computing device 102 takes the form of glasses-style wearable computing device. Note that wearable computing device 102 may also be considered an example of a head-mountable device (HMD), and thus may also be referred to as an HMD 102. It should be understood, however, that exemplary systems and devices may take the form of or be implemented within or in association with other types of devices. As illustrated in FIG. 1A, the wearable computing device 102 comprises frame elements including lens-frames 104, 106 and a center frame support 108, lens elements 110, 112, and extending side-arms 114, 116. The center frame support 108 and the extending side-arms 114, 116 are configured to secure the wearable computing device 102 to a user's head via placement on a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the head-mounted device 102. Other materials are possible as well. Each of the lens elements 110, 112 may also be sufficiently transparent to allow a user to see through the lens element.

The extending side-arms 114, 116 may each be projections that extend away from the lens-frames 104, 106, respectively, and may be positioned behind a user's ears to secure the HMD 102 to the user's head. The extending side-arms 114, 116 may further secure the HMD 102 to the user by extending to or around a rear portion of the user's head. Additionally or alternatively, for example, the HMD 102 may connect to or be affixed within a head-mountable helmet structure. Other possibilities exist as well.

The HMD 102 may also include an on-board computing system 118 and at least one finger-operable touch pad 124. The on-board computing system 118 is shown to be integrated in side-arm 114 of HMD 102. However, an on-board computing system 118 may be provided on or within other parts of the head-mounted device 102 or may be positioned remotely from and communicatively coupled to a head-mountable component of a computing device (e.g., the on-board computing system 118 could be housed in a separate component that is not head wearable, and is wired or wirelessly connected to a component that is head wearable). The on-board computing system 118 may include a processor and memory, for example. The on-board computing system 118 may include multiple processors as well. Further, the on-board computing system 118 may be configured to receive and analyze data from a finger-operable touch pad 124 (and possibly from other sensory devices and/or user interface components).

In a further aspect, an HMD 102 may include various types of sensors and/or sensory components. For instance, HMD 102 includes an inertial measurement unit (IMU) 130, which provides an accelerometer, gyroscope, and/or magnetometer. The HMD 102 may alternatively or additionally include an accelerometer, a gyroscope, and/or a magnetometer that is not integrated in an IMU.

In a further aspect, HMD 102 may include sensors that facilitate a determination as to whether or not the HMD 102 is being worn. For instance, sensors like an accelerometer, gyroscope, and/or magnetometer could be used to detect motion that is characteristic of the HMD being worn (e.g., motion that is characteristic of user walking about, turning their head, and so on), and/or used to determine that the HMD is in an orientation that is characteristic of the HMD being worn (e.g., upright, in a position that is typical when the HMD is worn over the ear). Accordingly, data from such sensors could be used as input to an on-head detection process. Additionally or alternatively, HMD 102 may include a capacitive sensor or another type of sensor that is arranged on a surface of the HMD 102 that typically contacts the wearer when the HMD 102 is worn. Accordingly data provided by such a sensor may be used to determine whether or not the HMD is being worn. Other sensors and/or other techniques may also be used to detect when the HMD is being worn.

In addition, the HMD 102 is configured to determine an HMD fitting parameter as an example indication of a fit of the HMD to the wearer, as described below.

The HMD 102 also includes at least one microphone 146, which may allow the HMD 102 to receive voice commands from a user. The microphone 146 may be a directional microphone or an omni-directional microphone. Further, in some embodiments, an HMD 102 may include a microphone array and/or multiple microphones arranged at various locations on the HMD.

In FIG. 1A, touch pad 124 is shown as being arranged on side-arm 114 of the HMD 102. However, the finger-operable touch pad 124 may be positioned on other parts of the HMD 102. Also, more than one touch pad may be present on the head-mounted device 102. For example, a second touchpad may be arranged on side-arm 116. Additionally or alternatively, a touch pad may be arranged on a rear portion 127 of one or both side-arms 114 and 116. In such an arrangement, the touch pad may arranged on an upper surface of the portion of the side-arm that curves around behind a wearer's ear (e.g., such that the touch pad is on a surface that generally faces towards the rear of the wearer, and is arranged on the surface opposing the surface that contacts the back of the wearer's ear). Other arrangements of one or more touch pads are also possible.

The touch pad 124 may sense the touch and/or movement of a user's finger on the touch pad via capacitive sensing, resistance sensing, or a surface acoustic wave process, among other possibilities. In some embodiments, touch pad 124 may be a one-dimensional or linear touchpad, which is capable of sensing touch at various points on the touch surface, and of sensing linear movement of a finger on the touch pad (e.g., movement forward or backward along the side-arm 124). In other embodiments, touch pad 124 may be a two-dimensional touch pad that is capable of sensing touch in any direction on the touch surface. Additionally, in some embodiments, touch pad 124 may be configured for near-touch sensing, such that the touch pad can sense when a user's finger is near to, but not in contact with, the touch pad. Further, in some embodiments, touch pad 124 may be capable of sensing a level of pressure applied to the pad surface.

In a further aspect, earpiece 140 and 141 are attached to side-arms 114 and 116, respectively. Earpieces 140 and 141 can each include a BCT 142 and 143, respectively. Each earpiece 140, 141 may be arranged such that when the HMD 102 is worn, each BCT 142, 143 is positioned to the posterior of a wearer's ear. For instance, in an exemplary embodiment, an earpiece 140, 141 may be arranged such that a respective BCT 142, 143 can contact the auricle of both of the wearer's ear. Other arrangements of earpieces 140, 141 are also possible. Further, embodiments with a single earpiece 140 or 141 are also possible.

In an exemplary embodiment, a BCT, for example BCT 142 and/or BCT 143, may operate as a bone-conduction speaker. For instance, a BCT may be implemented with a vibration transducer that is configured to receive an audio signal and to vibrate a wearer's bone structure in accordance with the audio signal. More generally, it should be understood that any component that is arranged to vibrate a wearer's bone structure may be incorporated as a bone-conduction speaker, without departing from the scope of the invention.

In a further aspect, HMD 102 may include at least one audio source (not shown) that is configured to provide an audio signal that drives BCT 142 and/or BCT 143. For instance, in an exemplary embodiment, an HMD 102 may include an internal audio playback device, for example, an on-board computing system 118 that is configured to play digital audio files. Additionally or alternatively, an HMD 102 may include an audio interface to an auxiliary audio playback device (not shown), for example, a portable digital audio player, a smartphone, a home stereo, a car stereo, and/or a personal computer, among other possibilities. In some embodiments, an application or software-based interface may allow for the HMD 102 to receive an audio signal that is streamed from another computing device, for example, the user's mobile phone. An interface to an auxiliary audio playback device could additionally or alternatively be a tip, ring, sleeve (TRS) connector, or may take another form. Other audio sources and/or audio interfaces are also possible.

Further, in an embodiment with two ear-pieces 140 and 141, which both include BCTs, the ear-pieces 140 and 141 may be configured to provide stereo audio. However, non-stereo audio is also possible in devices that include two ear-pieces.

Figure 1B:
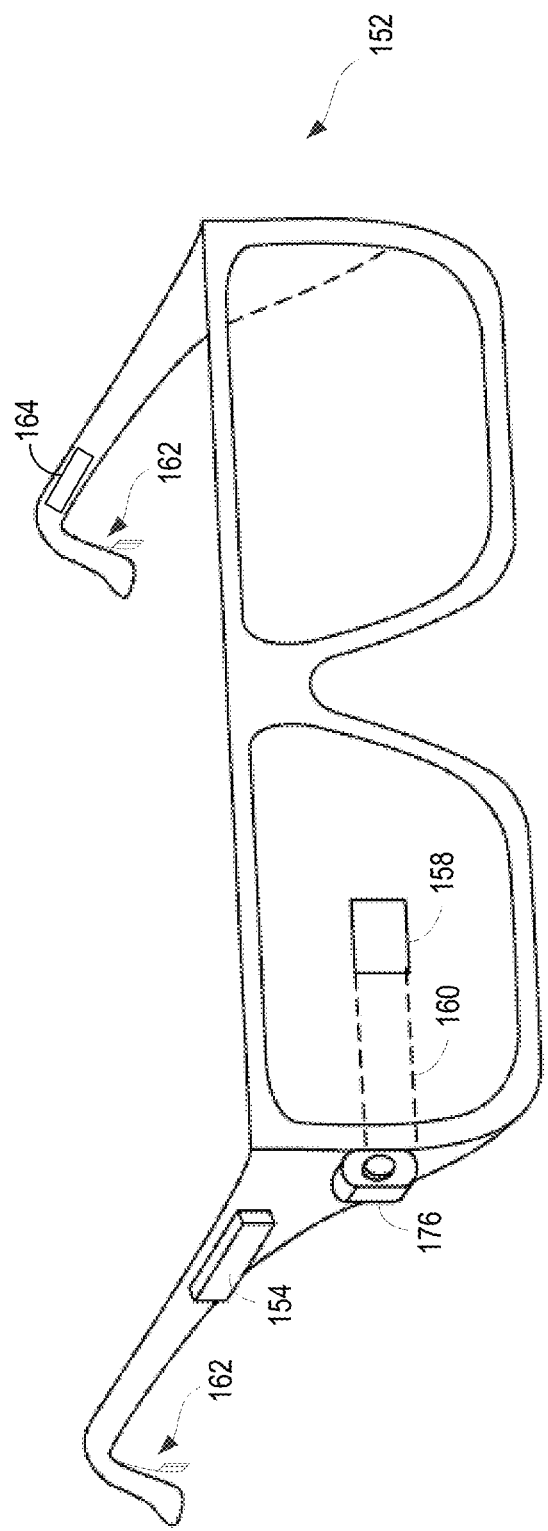
FIG. 1B illustrates another wearable computing device, according to an example embodiment.

Note that in the example shown in FIG. 1A, HMD 102 does not include a graphical display. FIG. 1B shows another wearable computing device 152 according to an example embodiment, which is similar to the HMD shown in FIG. 1A but includes a graphical display. In particular, the wearable computing device shown in FIG. 1B takes the form of a glasses-style HMD 152 with a near-eye display 158. As shown, HMD 152 may include BCTs 162 that is configured and functions similarly to BCTs 142 and 143, an onboard computing system 158 that is configured and functions similarly to onboard computing system 118, an IMU 164 that is configured and functions similar to the IMU 130, and a microphone 176 that is configured and functions similarly to microphone 146. HMD 152 may additionally or alternatively include other components, which are not shown in FIG. 1B.

The IMU 164 is connected to the BCT 162 by being positioned on the same glasses arm, and also, can be positioned near the BCT 162 as shown in FIG. 1B. In some examples, the IMU 164 is co-located with the BCT 162 on the same glasses arm or rigid frame. In further examples, the IMU 164 can be physically or directly connected to the BCT 162.

HMD 152 includes a single graphical display 158, which may be coupled to the on-board computing system 158, to a standalone graphical processing system, and/or to other components of HMD 152. The display 158 may be formed on one of the lens elements of the HMD 152, for example a lens element described with respect to FIG. 1A, and may be configured to overlay computer-generated graphics in the wearer's field of view, while also allowing the user to see through the lens element and concurrently view at least some of their real-world environment. (Note that in other embodiments, a virtual reality display that substantially obscures the user's view of the physical world around them is also possible.) The display 158 is shown to be provided in a center of a lens of the HMD 152, however, the display 158 may be provided in other positions, and may also vary in size and shape. The display 158 may be controllable via a computing system 154 that is coupled to the display 158 via an optical waveguide 160.

Other types of near-eye displays are also possible. For example, a glasses-style HMD may include one or more projectors (not shown) that are configured to project graphics onto a display on an inside surface of one or both of the lens elements of HMD. In such a configuration, the lens element(s) of the HMD may act as a combiner in a light projection system and may include a coating that reflects the light projected onto them from the projectors, towards the eye or eyes of the wearer. In other embodiments, a reflective coating may not be used (e.g., when the one or more projectors take the form of one or more scanning laser devices).

As another example of a near-eye display, one or both lens elements of a glasses-style HMD could include a transparent or semi-transparent matrix display, for example an electroluminescent display or a liquid crystal display, one or more waveguides for delivering an image to the user's eyes, or other optical elements capable of delivering an in focus near-to-eye image to the user. A corresponding display driver may be disposed within the frame of the HMD for driving such a matrix display. Alternatively or additionally, a laser or LED source and scanning system could be used to draw a raster display directly onto the retina of one or more of the user's eyes. Other types of near-eye displays are also possible.

Generally, it should be understood that an HMD and other types of wearable devices may include other types of sensors and components, in addition or in the alternative to those described herein. Further, variations on the arrangements of sensory systems and components of an HMD described herein, and different arrangements altogether, are also possible.

Figure 2A:
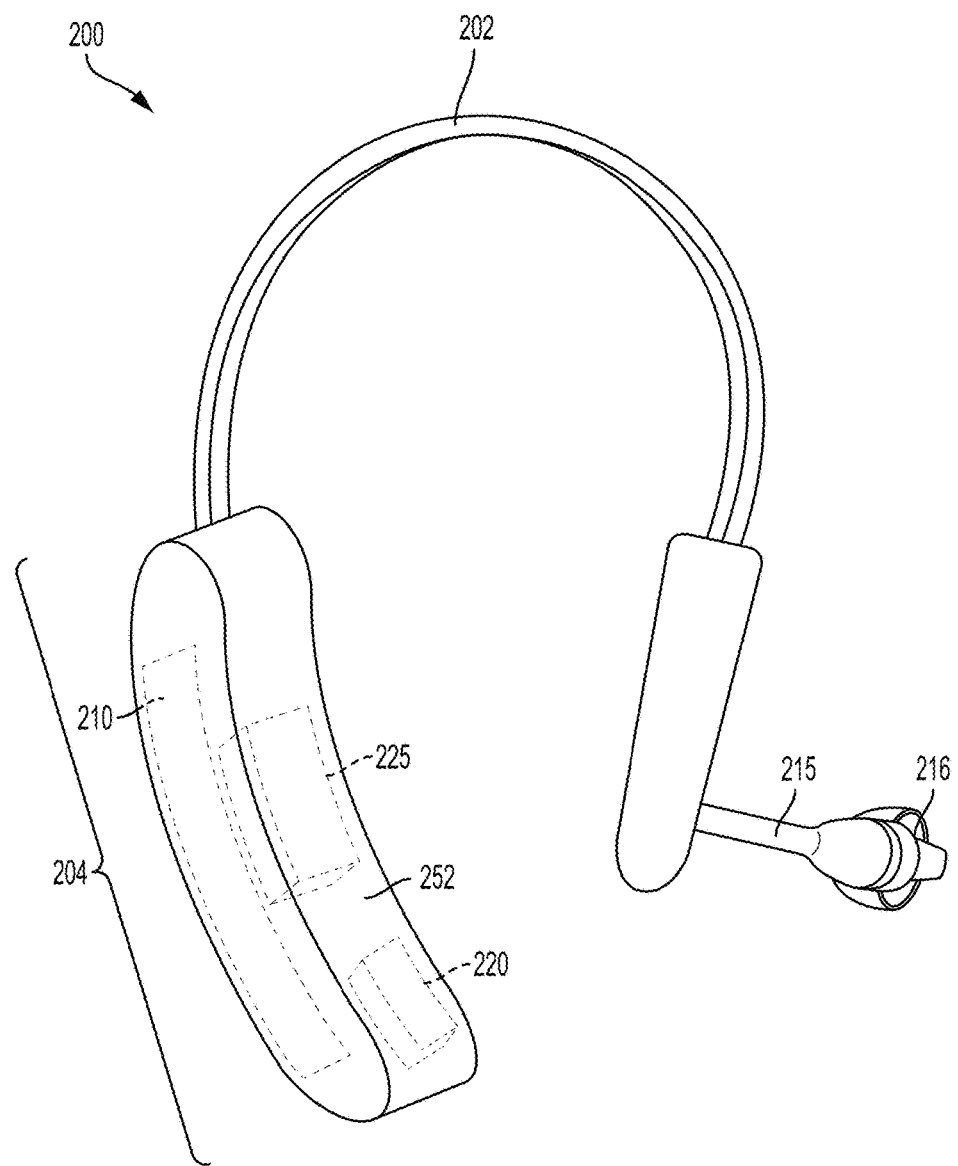
FIG. 2A illustrates a wearable computing device as an earpiece device, according to an example embodiment.
Figure 2C:
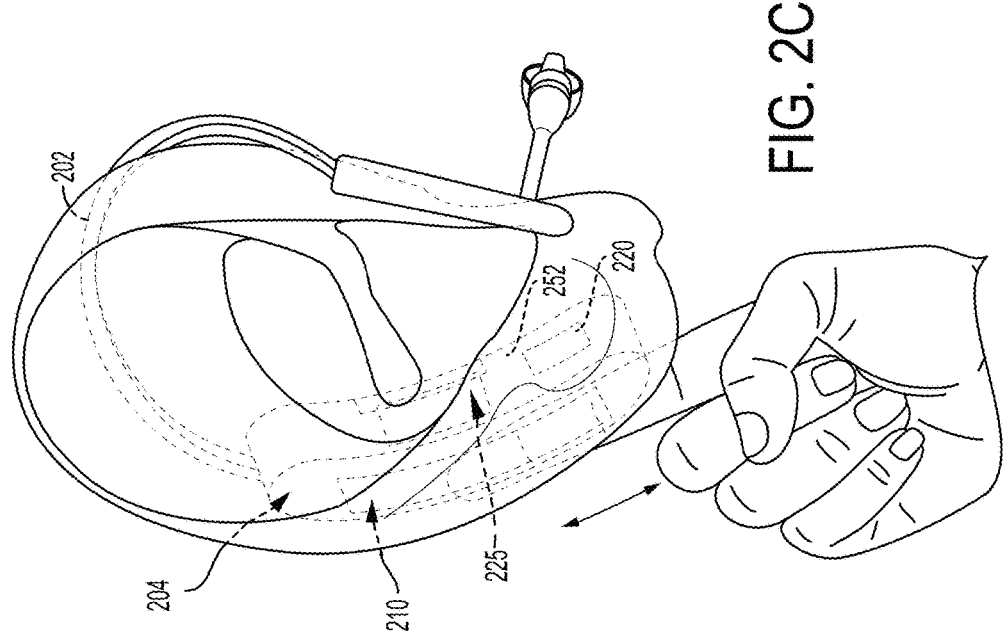
FIG. 2C illustrates the earpiece device of FIG. 2A in use, according to an example embodiment.
Figure 2B:
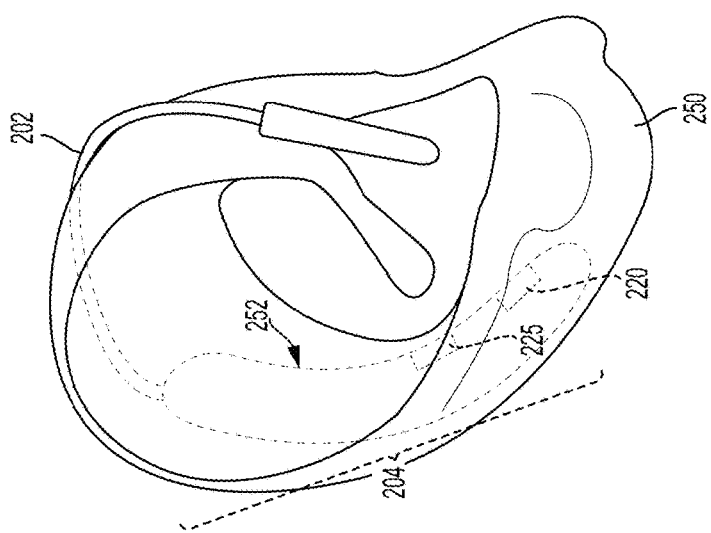
FIG. 2B illustrates the earpiece device of FIG. 2A being worn, according to an example embodiment.

FIGS. 2A to 2C show another wearable computing device according to an example embodiment. More specifically, FIGS. 2A to 2C show an earpiece device 200, which includes a frame 202 and a behind-ear housing 204. As shown in FIG. 2B, the frame 202 is curved, and is shaped so as to hook over a wearer's ear 250. When hooked over the wearer's ear 250, the behind-ear housing 204 is located behind the wearer's ear. For example, in the illustrated configuration, the behind-ear housing 204 is located behind the auricle, such that a surface 252 of the behind-ear housing 204 contacts the wearer on the back of the auricle.

Note that the behind-ear housing 204 may be partially or completely hidden from view, when the wearer of earpiece device 200 is viewed from the side. As such, an earpiece device 200 may be worn more discreetly than other bulkier and/or more visible wearable computing devices.

Referring back to FIG. 2A, the behind-ear housing 204 may include an IMU 220, a BCT 225, and touch pad 210. The IMU 220 is connected to the BCT 225 as being mounted on the same housing 204. BCT 225 may be, for example, a vibration transducer or an electro-acoustic transducer that produces sound in response to an electrical audio signal input. As such, BCT 225 may function as a bone-conduction speaker that plays audio to the wearer by vibrating the wearer's bone structure. Other types of BCTs are also possible. Generally, a BCT may be any structure that is operable to directly or indirectly vibrate the bone structure of the user.

As shown in FIG. 2C, the BCT 225 may be arranged on or within the behind-ear housing 204 such that when the earpiece device 200 is worn, BCT 225 is positioned posterior to the wearer's ear, in order to vibrate the wearer's bone structure. More specifically, BCT 225 may form at least part of, or may be vibrationally coupled to the material that forms, surface 252 of behind-ear housing 204. Further, earpiece device 200 may be configured such that when the device is worn, surface 252 is pressed against or contacts the back of the wearer's ear. As such, BCT 225 may transfer vibrations to the wearer's bone structure via surface 252. Other arrangements of a BCT on an earpiece device are also possible.

As shown in FIG. 2C, the touch pad 210 may arranged on a surface of the behind-ear housing 204 that curves around behind a wearer's ear (e.g., such that the touch pad is generally faces towards the wearer's posterior when the earpiece device is worn). Other arrangements are also possible.

In some embodiments, touch pad 210 may be a one-dimensional or linear touchpad, which is capable of sensing touch at various points on the touch surface, and of sensing linear movement of a finger on the touch pad (e.g., movement upward or downward on the back of the behind-ear housing 204). In other embodiments, touch pad 210 may be a two-dimensional touch pad that is capable of sensing touch in any direction on the touch surface. Additionally, in some embodiments, touch pad 210 may be configured for near-touch sensing, such that the touch pad can sense when a user's finger is near to, but not in contact with, the touch pad. Further, in some embodiments, touch pad 210 may be capable of sensing a level of pressure applied to the pad surface.

In the illustrated embodiment, earpiece device 200 also includes a microphone arm 215, which may extend towards a wearer's mouth, as shown in FIG. 2B. Microphone arm 215 may include a microphone 216 that is distal from the earpiece. Microphone 216 may be an omni-directional microphone or a directional microphone. Further, an array of microphones could be implemented on a microphone arm 215. Alternatively, a bone conduction microphone (BCM), could be implemented on a microphone arm 215. In such an embodiment, the arm 215 may be operable to locate and/or press a BCM against the wearer's face near or on the wearer's jaw, such that the BCM vibrates in response to vibrations of the wearer's jaw that occur when they speak. Note that the microphone arm 215 is optional, and that other configurations for a microphone are also possible. Further, in some embodiments, microphone arm 215 may be a removable component, which can be attached and detached from the earpiece device 200 by the user.

In some embodiments, a wearable device may include two types of microphones: one or more microphones arranged specifically to detect speech by the wearer of the device, and one or more microphones that are arranged to detect sounds in the wearer's environment (perhaps in addition to the wearer's voice). Such an arrangement may facilitate intelligent processing based on whether or not audio includes the wearer's speech.

In some embodiments, a wearable device may include an ear bud (not shown), which may function as a typical speaker and vibrate the surrounding air to project sound from the speaker. Thus, when inserted in the wearer's ear, the wearer may hear sounds in a discrete manner. Such an ear bud is optional, and may be implemented a removable (e.g., modular) component, which can be attached and detached from the earpiece device by the user.

Figure 3:
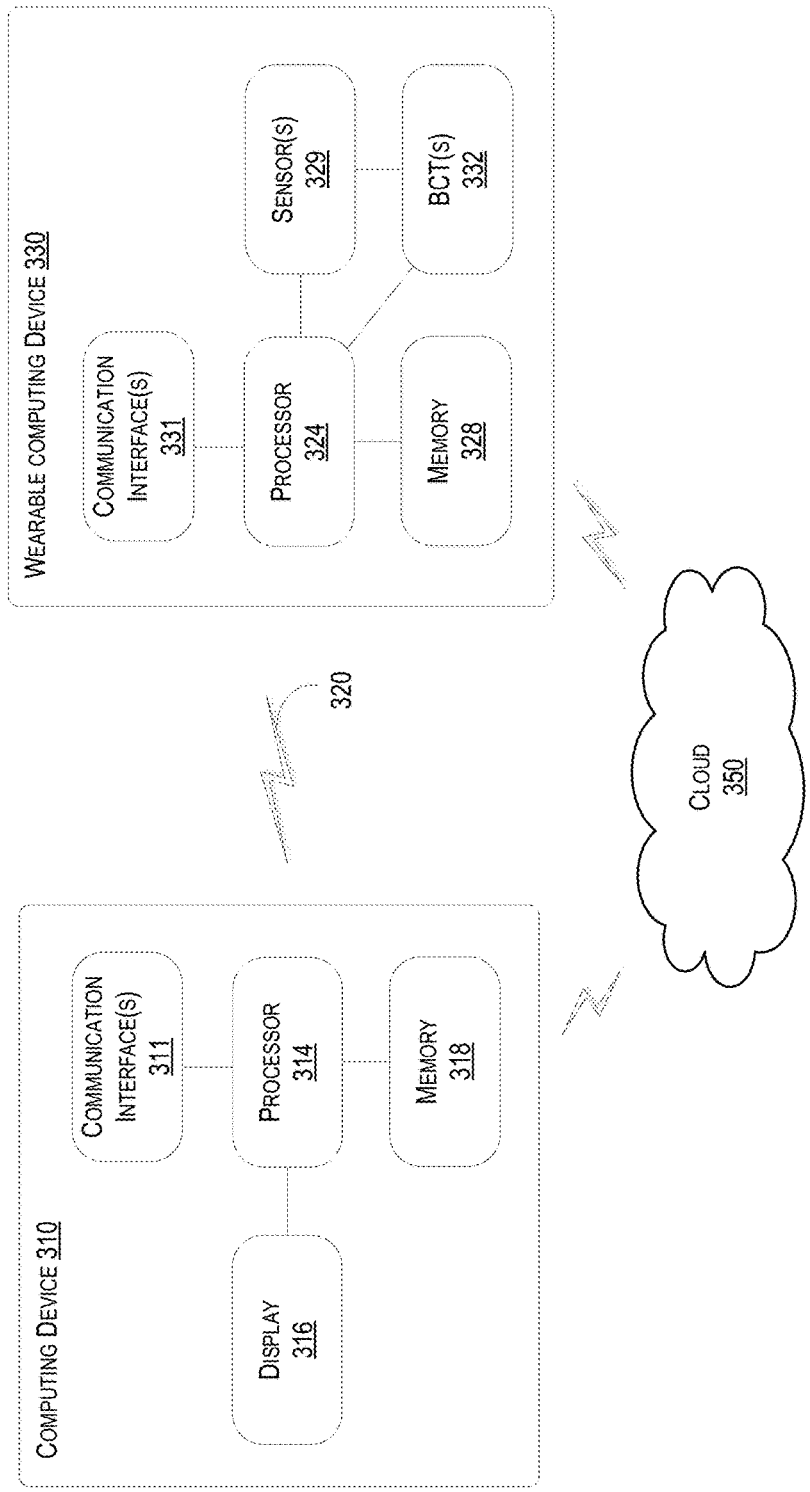
FIG. 3 is a block diagram illustrating components of a computing device and a wearable computing device, according to an example embodiment

FIG. 3 is a block diagram showing basic components of a computing device 310 and a wearable computing device 330, according to an example embodiment. In an example configuration, computing device 310 and wearable computing device 330 are operable to communicate via a communication link 320 (e.g., a wired or wireless connection). Computing device 310 may be any type of device that can receive data and display information corresponding to or associated with the data. For example, the computing device 310 may be a mobile phone, a tablet computer, a laptop computer, a desktop computer, or an in-car computer, among other possibilities. Wearable computing device 330 may be a wearable computing device for example those described in reference to FIGS. 1A, 1B, 2A, 2B, and 2C, a variation on these wearable computing devices, or another type of wearable computing device altogether.

The wearable computing device 330 and computing device 310 include hardware and/or software to enable communication with one another via the communication link 320, for example processors, transmitters, receivers, antennas, etc. In the illustrated example, computing device 310 includes one or more communication interfaces 311, and wearable computing device 330 includes one or more communication interfaces 331. As such, the wearable computing device 330 may be tethered to the computing device 310 via a wired or wireless connection. Note that such a wired or wireless connection between computing device 310 and wearable computing device 330 may be established directly (e.g., via Bluetooth), or indirectly (e.g., via the Internet or a private data network).

In a further aspect, note that while computing device 310 includes a graphic display system 316, the wearable computing device 330 does not include a graphic display. In such a configuration, wearable computing device 330 may be configured as a wearable audio device, which allows for advanced voice control and interaction with applications running on another computing device 310 to which it is tethered.

As noted, communication link 320 may be a wired link, for example a universal serial bus or a parallel bus, or an Ethernet connection via an Ethernet port. A wired link may also be established using a proprietary wired communication protocol and/or using proprietary types of communication interfaces. The communication link 320 may also be a wireless connection using, e.g., Bluetooth® radio technology or other short-range wireless communication, communication protocols described in IEEE 802.11 (including any IEEE 802.11 revisions), Cellular technology (for example, GSM, CDMA, UMTS, EV-DO, WiMAX, or LTE), or Zigbee® technology, among other possibilities.

As noted above, to communicate via communication link 320, computing device 310 and wearable computing device 330 may each include one or more communication interface (s) 311 and 331 respectively. The type or types of communication interface(s) included may vary according to the type of communication link 320 that is utilized for communications between the computing device 310 and the wearable computing device 330. As such, communication interface(s) 311 and 331 may include hardware and/or software that facilitates wired communication using various different wired communication protocols, and/or hardware and/or software that facilitates wireless communications using various different wired communication protocols.

Computing device 310 and wearable computing device 330 include respective processing systems 314 and 324. Processors 314 and 324 may be any type of processor, for example, a micro-processor or a digital signal processor.

Note that computing device 310 and wearable computing device 330 may have different types of processors, or the same type of processor. Further, one or both of computing device 310 and a wearable computing device 330 may include multiple processors.

Computing device 310 and a wearable computing device 330 further include respective on-board data storage, for example, memory 318 and memory 328. Processors 314 and 324 are communicatively coupled to memory 318 and memory 328, respectively. Memory 318 and/or memory 328 (any other data storage or memory described herein) may be computer-readable storage media, which can include volatile and/or non-volatile storage components, for example, optical, magnetic, organic or other memory or disc storage. Such data storage can be separate from, or integrated in whole or in part with one or more processor(s) (e.g., in a chipset). In some implementations, the data storage 104 can be implemented using a single physical device (e.g., one optical, magnetic, organic or other memory or disc storage unit), while in other implementations, the data storage 104 can be implemented using two or more physical devices.

Memory 318 can store machine-readable program instructions that can be accessed and executed by the processor 314. Similarly, memory 328 can store machine-readable program instructions that can be accessed and executed by the processor 324.

In an exemplary embodiment, memory 318 may include program instructions stored on a non-transitory computer-readable medium and executable by the at least one processor to provide a graphical user-interface (GUI) on a graphic display 316.

The wearable computing device 330 also includes sensors 329 coupled to the processor 324. The sensors 329 may include an IMU, or an accelerometer, a gyroscope, or other motion sensing sensors. The wearable computing device 330 also includes BCT(s) 332 connected to the sensors 329 and also in communication with the processor 324.

In a further aspect, a communication interface 311 of the computing device 310 may be operable to receive a communication from the wearable audio device that is indicative of whether or not the wearable audio device is being worn. Such a communication may be based on sensor data generated by at least one sensor of the wearable audio device. As such, memory 318 may include program instructions providing an on-head detection module.

In an example operation, the BCT(s) 332 of the wearable computing device 330 transmit an audio signal, and an IMU or an accelerometer of the sensor(s) 329 that is connected to the BCT 332 detects movement of the wearable computing device 330 due to vibrations of the BCT(s) 332 transmitting the audio signal. The sensor(s) 329 provides an output of the detected movement. The processor 324 receives the output of the sensor(s) 329 and compares the outputs of the sensor(s) 329 with at least one reference signal. The reference signal may be stored in the memory 328, and the reference signal is based on the audio signal that is transmitted. The processor 324 then outputs a fitting parameter based on the comparison, or an indication of a fit of the wearable computing device 330 to a wearer of the wearable computing device 330 based on the comparison.

With this example operation, the wearable computing device 330 is able to inform a user of whether the wearable computing device 330 is properly fitted with a proper contact with the user's temple or ear. If the fitting is not tight, sound transmitted to the inner ear will be a low volume or distorted. The sensor(s) 329 can measure the subtle movement of the wearable computing device 330 caused by mechanical vibrations from the BCT(s) 332 while the BCT(s) 332 are active, and a comparison of outputs of the sensor(s) 329 to a reference signal can provide indications between a good fitting and a poor fitting. Because the sensor(s) 329 are mounted on a same housing as the BCT(s) 332 that is being worn, the sensor(s) 329 detect movement directly proportional and related to movement caused by the BCT(s) 332. Also, this enables the sensor(s) 329 to measure vibrations of the BCT(s) 332 when the wearable computing device 330 is being worn and used.

As a result, the determine an indication of a fit of the wearable computing device 330 to a user, the sensor(s) 329 detect vibrations of the wearable computing device 330 as the wearable computing device 330 is being worn by a wearer and the BCT(s) 332 are transmitting the audio signal, such that the wearable computing device 330 is coupled to the wearer and the sensor(s) 329 detect vibrations of the wearable computing device 330—wearer coupling. In this example, the sensor(s) 329 detect movement of the wearable computing device 330 due to vibrations that are representative of a mass, and the mass includes the wearable computing device 330 coupled to a wearer. Thus, when the wearable computing device 330 has a good fitting, the wearable computing device 330 is vibrating with a larger mass than when the wearable computing device 330 has a poor or loose fitting. This results because with good fittings, the head of the wearer contributes to the mass, and with loose fittings, the head of the wearer contributes less to the mass. Outputs of the sensor(s) 329 in instances of tight vs. loose fittings are quite different in frequency domain as well as time-domain, and reference signals including tight fittings, loose fittings, and fittings along a spectrum of known tight to known loose fittings can be generated and used for comparison.

The processor 324 outputs an HMD fitting parameter, which may be setup to indicate tight vs. loose fittings. For example, a tight fit on a wearer can be associated with a high fitting parameter, and a loose fit on a wearer can be associated with a low fitting parameter. Different or opposite scales can be used. With this example, however, for vibrations indicative of a mass having a first size based on the wearable computing device 330 that have a first HMD fitting parameter and the vibrations indicative of a mass having a second size based on the HMD that have a second HMD fitting parameter will result due to the first size being larger than the second size and the first HMD fitting parameter being higher than the second HMD fitting parameter.

In further examples, the indication of the fit of the wearable computing device 330 is determined from among a spectrum of fitting including a poor fit to a tight fit, and the reference signal includes reference signal data that is indicative of known accelerometer outputs for movement due to vibrations of the BCT(s) 332 transmitting the audio signal in instances for a variety of measures of contact of the BCT(s) 332 with a wearer resulting in a variety of fittings along the spectrum. Outputs of comparison of the sensor(s) 329 to the reference signal can then be used to identify an indication of the fit of the wearable computing device 330 to the wearer.

The spectrum can be established from an extreme loose fitting in which the wearable computing device 330 is not being worn, to an extreme tight fitting in which the wearable computing device 330 fits perfectly. The extreme tight fitting example may be subjective per wearer, and updated over time.

Some examples above include the wearable computing device 330 performing processing to determine the fitting parameter. In other examples, the computing device 310 may receive the outputs of the sensor(s) 329 and the computing device 310 can determine the fitting parameter and output the fitting parameter back to the wearable computing device 330 for displaying to the wearer. The computing device 310 may further include a display screen (e.g., in instances in which the computing device 310 takes the form of a mobile cell phone, laptop computer, or the like), and the computing device 310 can alternatively or additionally display the fitting parameter to the wearer.

In still other examples, the computing device 310 and/or the wearable computing device 330 are configured to communicate (wired or wirelessly) with a cloud 350 (e.g., group of computers or servers, or the Internet), and the cloud 350 performs the processing to determine the fitting parameter based on information received related to outputs of the sensors 329. The cloud 350 then provides the fitting parameter to the computing device 310 and/or the wearable computing device 330.

In the instance where the wearer consents to use of such data output by the wearable computing device 330, the data may be used for determining the fitting parameter.

Further to the descriptions above, a wearer may be provided with controls allowing the wearer to make an election as to both if and when devices, systems, programs or features described herein may enable collection of wearer/user information (e.g., information about a wearer). In addition, certain data may be treated in one or more ways before it is stored or used, so that personally identifiable information is removed. For example, a wearer's identity may be treated so that no personally identifiable information can be determined for the wearer, or a wearer's geographic location may be generalized where location information is obtained (such as to a city, ZIP code, or state level), so that a particular location of a wearer cannot be determined. Thus, the wearer may have control over what information is collected about the wearer, how that information is used, and what information is provided to the wearer.

Experiments were performed using an example wearable computing device similar to that shown in FIG. 3 with a BCT and a built-in IMU with ear hook for a wearer. The ear hook has various sizes, and each size provides a different fit for the same wearer. The experiments were conducted with the same wearer trying multiple sizes (e.g., a medium size hook and a large size hook). For the wear, the medium size hook fits properly to provide a loud and clear sound from the BCT, and the large size hook fits loosely resulting in a lower volume and reduced clarity of sound from the BCT.

The resonant frequency of the wearable computing device was about 880 Hz resulting in a strongest vibration when playing a chirp signal within a frequency range of about 600 Hz to about 1200 Hz. Therefore, initially a short tone was played at 880 Hz and IMU samples were captured when wearing the wearable computing device with the large hook and then again when wearing the wearable computing device with the medium hook. For comparison purposes, the wearer is stationary during the measurements so that wearer movement captured by IMU does not dominate the measured vibrations, but rather, vibrations caused by the BCT are dominate in the IMU measurements.

Figure 4:
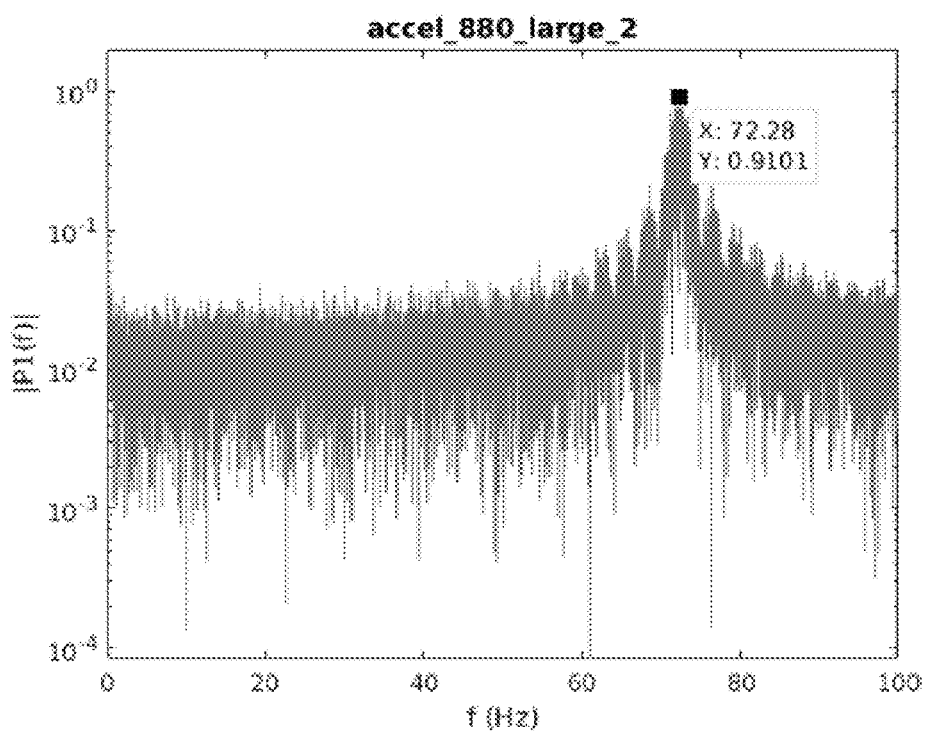
FIG. 4 is an example plot of IMU measurements with the wearable computing device in a loose fitting.
Figure 5:
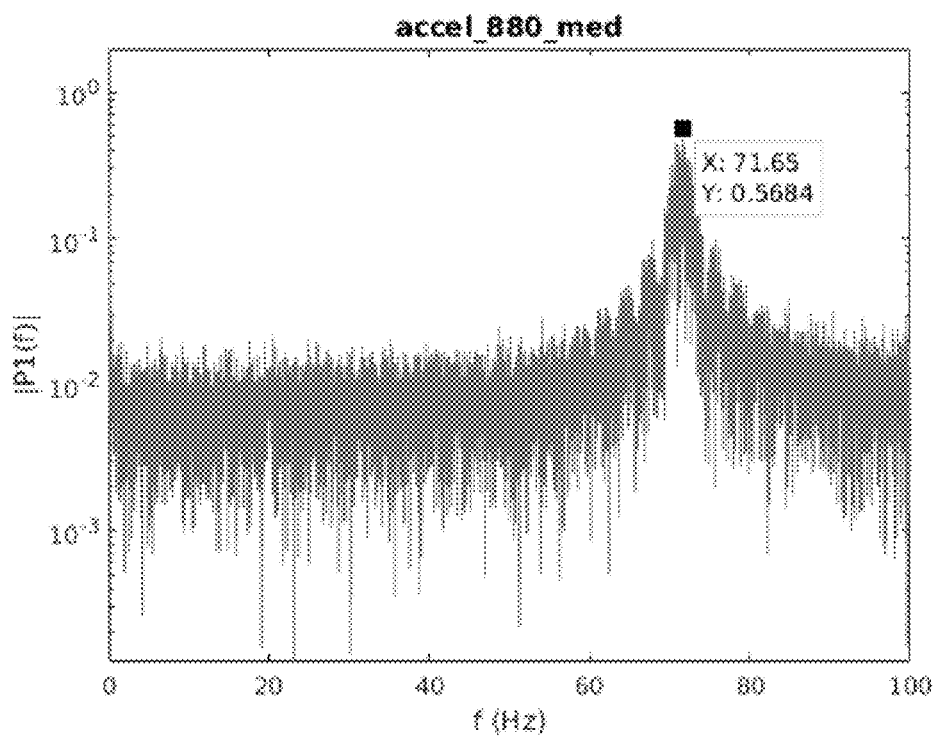
FIG. 5 is an example plot of IMU measurements with the wearable computing device in a tight fitting.

The IMU was operated at 200 Hz to be lower than the tone frequency. Plotting the spectrum of IMU measurements using the Z-axis of the accelerometer as the Z-axis has the same orientation as movement of BCT shows the aliasing frequency. FIG. 4 is an example plot of the IMU measurements with the wearer using the large hook (e.g., loose fitting). FIG. 5 is an example plot of the IMU measurements with the wearer using the medium hook (e.g., tight fitting).

At the same resonant frequency, the amplitude of spectrum for the large hook versus the medium hook is 0.9101 versus 0.5684, and it is 4 dB higher in power. Thus, a difference in a tight fitting versus a loose fitting is discernable from outputs of the IMU while the device is being worn and the signal is being transmitted by the BCT.

Figure 6:
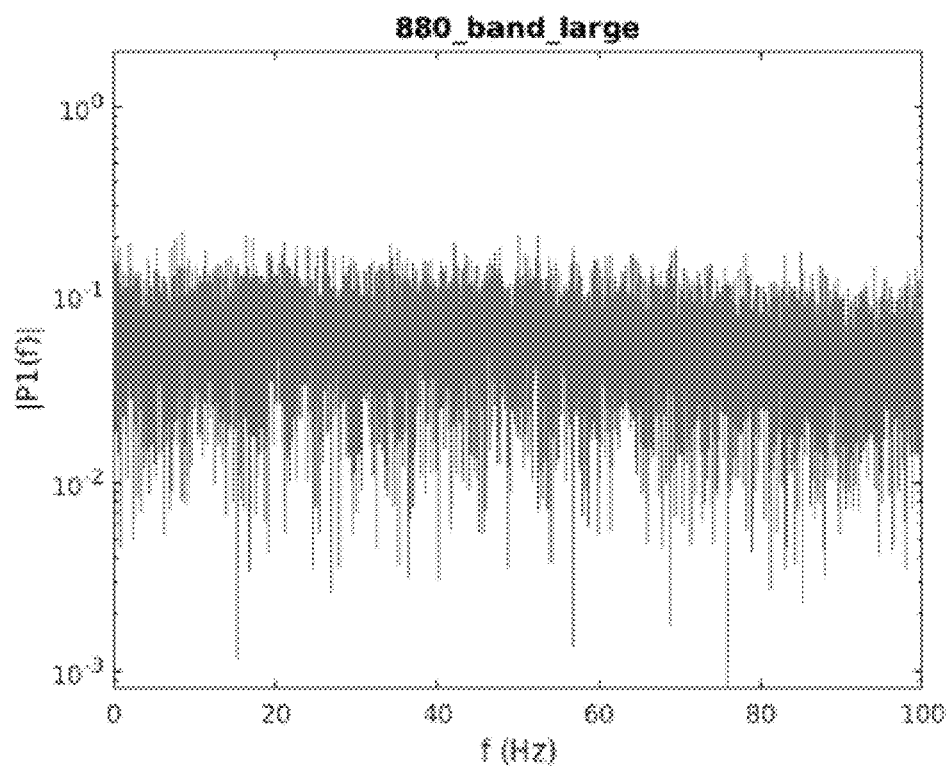
FIG. 6 is an example plot of IMU measurements with the wearable computing device in a loose fitting for a white noise signal.
Figure 7:
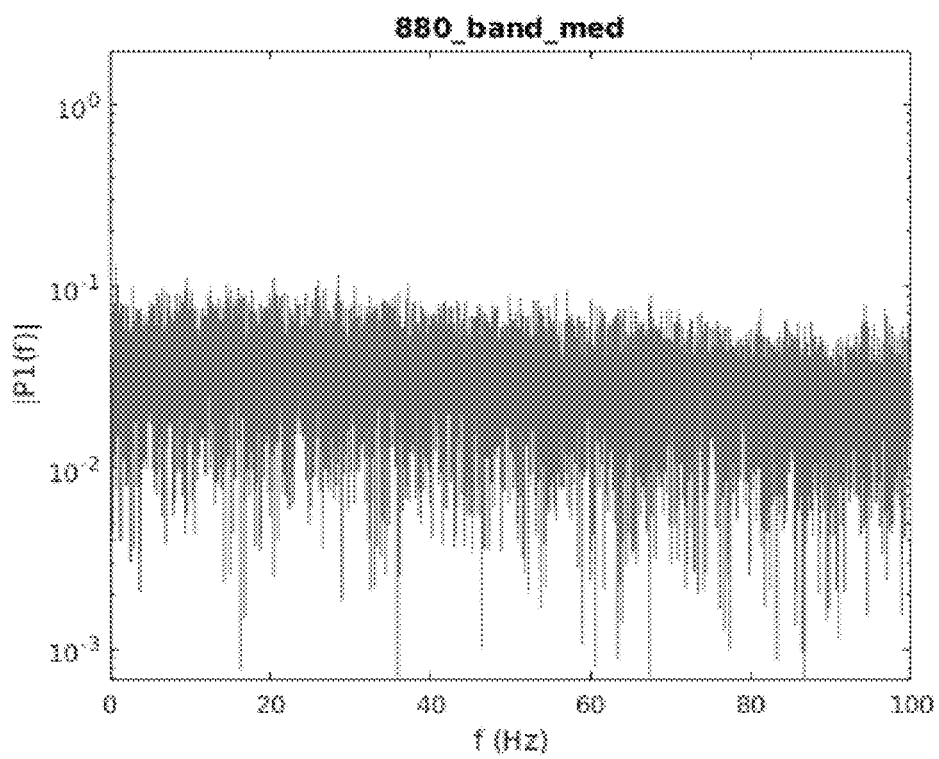
FIG. 7 is an example plot of IMU measurements with the wearable computing device in a tight fitting for a white noise signal.

In a second experiment, a white noise band-filtered signal at about 880 Hz was generated by the BCT with a passband width of about 100 Hz, and outputs of the IMU were collected using each of the medium and large hooks for a tight and loose fitting comparison. In the IMU spectrum comparison, a larger difference is found between usage of the large hook (loose fitting) and the medium hook (tight fitting). FIG. 6 is an example plot of the IMU measurements with the wearer using the large hook (e.g., loose fitting) for the white noise signal. FIG. 7 is an example plot of the IMU measurements with the wearer using the medium hook (e.g., tight fitting) for the white noise signal. The average spectrum amplitude of the large hook versus the medium hook is 0.0617 versus 0.0332 or 5.34 dB higher in power. Thus, again a difference in a tight fitting versus a loose fitting is discernable from outputs of the IMU while the device is being worn and the white noise signal is being transmitted by the BCT.

Based on these examples experiments, detection of a measurable difference in IMU signal energy is found between a tight and a loose fitting of the wearable device when playing a testing tone or white noise by the BCT at about a resonant frequency.

Using the IMU outputs thus enables detection of a fitting parameter. The fitting parameter can be selected among a tight vs. loose fit, or from among a spectrum of possible fittings. In such examples, a wearer may first calibrate IMU outputs to the fit of the wearer to collect wearer-specific data representative of the fit of the specific wearable computing device to the wearer and also representative of the wearer's subjective preferences for a good or tight fit versus a poor or loose fit.

For an initial calibration sequence, a wearer may wear the wearable computing device in comfortable manner, and when ready, cause the wearable computing device to play a predetermined signal. The predetermined signal can be generated by the BCT at about a resonant frequency of the wearable computing device. The IMU is operated to collect samples while the BCT is playing the signal. Following, a frequency analysis is performed to identify the amplitude of spectrum at the same resonant frequency, and this amplitude can be set as representative of an IMU output for a good fit to set a baseline response. Any number of additional calibrations may be performed with the wearer adjusting how the wearable device is worn and marking such IMU outputs as desired by the wearer. A baseline poor fit can be obtained by operating the BCTs with the device not being worn, such that outputs of the IMU are not attributable to any worn condition.

Once calibration has been completed, the calibrated signals can be used as known or reference signals for comparison. Then, when the wearable device is in use with the BCTs operating, outputs of the IMU can be collected and compared to the reference signals to determine a fitting parameter of the wearable computing device, or more simply, to determine whether the wearable computing device has been worn properly.

In these examples, the audio signal transmitted by the BCT can be considered a calibration audio signal, and the reference signal is indicative of a known IMU sensor output for movement due to vibrations of the BCT transmitting the calibration audio signal in an instance for a measure of contact of the BCT with a wearer that is above a threshold level resulting in a good fit. The outputs of the IMU sensor are then matched to the reference signal, and a measure of contact of the BCT with the wearer is identified as corresponding to the matched reference signal so as to determine the HMD fitting parameter based on the identified measure of contact.

Additional reference signals can be provided that are indicative of a known IMU sensor output for movement due to vibrations of the BCT transmitting the calibration audio signal in an instance for a measure of contact of the bone conduction transducer with a wearer that is below a threshold level resulting in a loose fitting. The outputs of the IMU sensor are then matched to the reference signal, and a measure of contact of the BCT with the wearer is identified as corresponding to the matched reference signal so as to determine the HMD fitting parameter based on the identified measure of contact.

Combining the reference signals can result in reference signal data that is indicative of known IMU sensor outputs for movement due to vibrations of the BCT transmitting the calibration audio signal in instances for a variety of measures of contact of the BCT with a wearer. Then, outputs of the IMU sensor can be matched to the reference signal data to identify a measure of contact of the BCT with the wearer as corresponding to the matched reference signal data so as to determine the HMD fitting parameter based on the identified measure of contact.

In some examples, the reference signal can be one that indicates a good measure of contact of the BCT with a temple of the wearer, and the HMD fitting parameter thus is determined to indicate a measure of contact of the bone conduction transducer with a temple of the wearer. In other examples, the reference signal can be one that indicates a good measure of contact of the BCT with an ear of the wearer, and the HMD fitting parameter thus is determined to indicate a measure of contact of the bone conduction transducer with an ear of the wearer. The reference signal can vary based on a structure of the wearable computing device.

Figure 8:
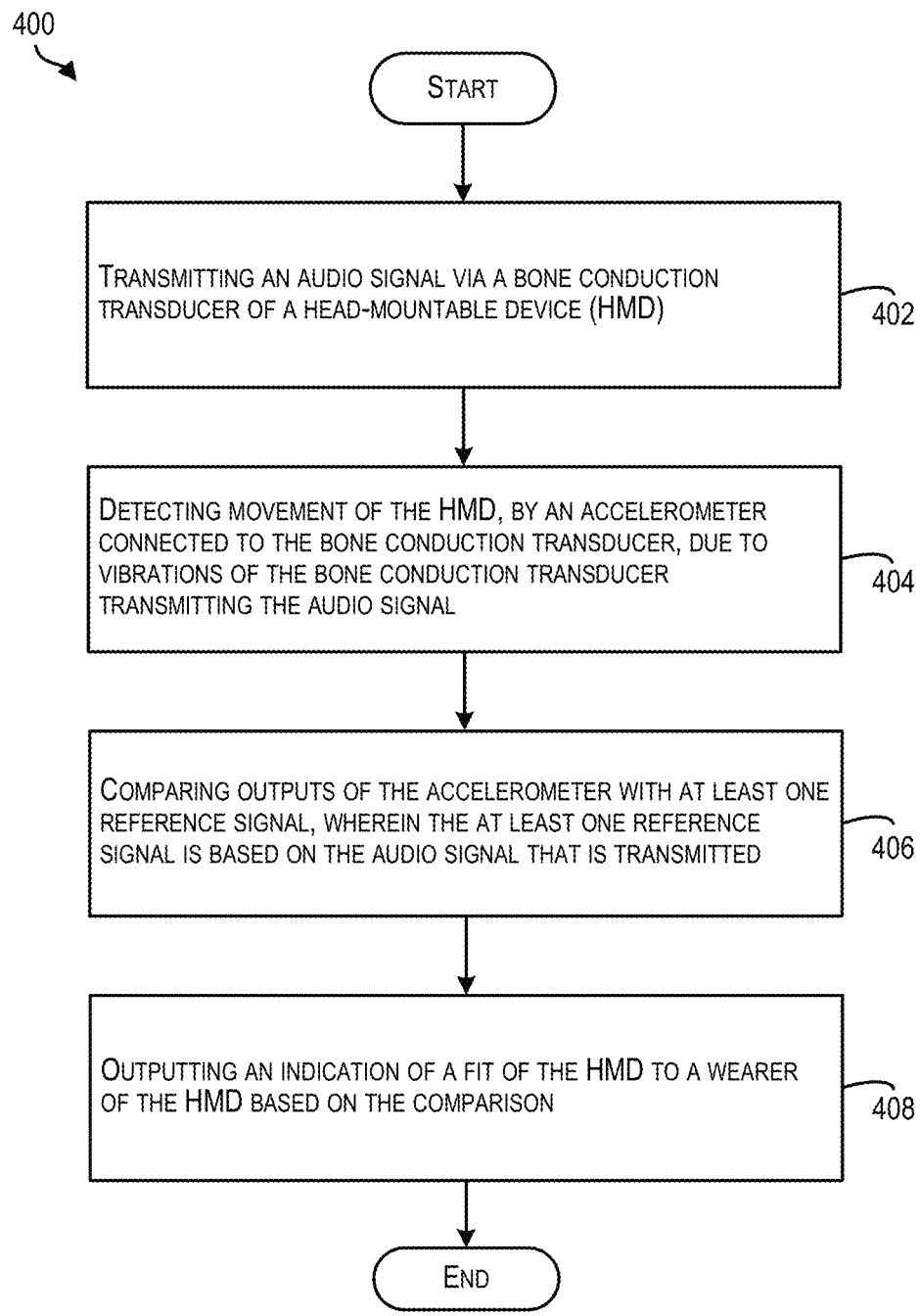
FIG. 8 is a block diagram of an example method for determining a fit of an HMD to a wearer, according to an example embodiment.

Referring now to FIG. 8, FIG. 8 is a block diagram of an example method 400 for determining a fit of an HMD to a wearer. Method 400 shown in FIG. 8 presents an embodiment of a method that could be performed by the wearable computing device 102 shown in FIG. 1A, the wearable computing device 152 shown in FIG. 1B, the ear piece device 200 shown in FIGS. 2A-2C, the computing device 310 and/or the wearable computing device 330 shown in FIG. 3, for example, or by any computing device. More specifically, method 400 presents an embodiment that could be performed by one or more processors of a wearable computing device and/or one or more application processors of a computing device. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, a storage device including a disk or hard drive. The computer readable medium may include non-transitory computer readable medium, for example, computer-readable media that stores data for short periods of time like register memory, processor cache and random access memory (RAM). The computer readable medium may also include non-transitory media, for example secondary or persistent long term storage, like read only memory (ROM), optical or magnetic disks, compact-disc read only memory (CD-ROM). The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

As shown at block 402, the method 400 includes transmitting an audio signal via a BCT of a head-mountable device (HMD).

As shown at block 404, the method 400 includes detecting movement of the HMD, by an accelerometer connected to the BCT, due to vibrations of the BCT transmitting the audio signal.

As shown at block 406, the method 400 includes comparing outputs of the accelerometer with at least one reference signal, and the at least one reference signal is based on the audio signal that is transmitted. For example, the reference signal is generated using the same audio signal being transmitted while the BCT are in use with the wearable computing device being worn.

As shown at block 408, the method 400 includes outputting an indication of a fit of the HMD to a wearer of the HMD based on the comparison. Using the data shown in FIGS. 4-7 as reference signals, in which a good/tight fit has an amplitude of spectrum of IMU outputs of 0.5684 for a chirp signal, and a poor/loose fit has an amplitude of spectrum of IMU outputs of 0.9101, comparisons of collected samples can be made to determine the fitting parameter. For example, amplitudes of spectrum of the IMU outputs can be compared, and if the amplitudes are closer to the good fit reference, an indication of good fit can be made. Thus, a variance of the measured amplitudes of spectrum of the IMU outputs can be compared to the reference amplitudes, and the fitting parameter is chosen as the parameter (tight/loose fit) to which the measured values are closest.

In some examples, the method 400 also includes receiving an input indicating that the fit of the HMD to the wearer is accepted, and updating the at least one reference signal to refer to the outputs of the accelerometer. In this example, a wearer may update or re-calibrate the reference signal as the wearer adjusts how the wearable computing device is worn.

In some examples, the method 400 may also include in response to the indication of the fit of the HMD to the wearer of the HMD being below a threshold level, prompting the wearer to re-fit the HMD. In this example, when the fit is determined to be a poor fit, the processors of the wearable computing device can provide an audio notification to a wearer of the HMD regarding the HMD fitting parameter, and the audio notification may further request that the wearer readjust the wearable computing device. In another example in which the HMD further includes a display, the processors can provide a visual notification on the display of the HMD regarding the HMD fitting parameter, as well as a request to readjust the wearable computing device if the fitting parameter is below a threshold.

In still further examples, the method 400 can include based on the fit of the HMD to the wearer of the HMD, tuning one or more audio parameters of the BCT. For instance, in situations where the fit is determined to be a poor fit, the volume of the BCT can be reduced so as not to provide an audio signal that can cause problems or be uncomfortable to the wearer due to the wearable computing device being in a loose fit. Or further, the volume of the BCT can be reduced completely or the BCT and/or the wearable computing device can be turned off, for example in instances in which the fit parameter is at a maximum loose fitting condition that likely indicates that the wearable computing device is not being worn.

In still further examples, a loose fit of the BCT may result in a lower volume to a wearer, and so the volume of the BCT can be increased based on a loose fit detection so that the wearer can still perceive a similar level of loudness even when worn loosely. These settings may be adjusted or customized by a wearer as to how audio parameters of the BCT are adjusted due to the HMD fitting parameter.

The method 400 may be performed at any time while the device is being worn or not. In some instances, the method 400 may be prompted to be performed in response to detecting that the HMD is being worn by the wearer. The HMD may include a proximity sensor or other sensor for determining that the device is being worn, and at that time, the HMD may perform the method 400 to determine an HMD fitting parameter. Thus, methods can be performed to both detect whether the device is being worn, and to generate an indication of how well the device is being worn. It should be understood that being worn can refer to "on-head detection" or any type of process or feature that indicates whether or not a wearable device is being worn by a wearer, on any part of the wearer's body. Other examples include determining whether or not a wrist-worn computing device (e.g., a smart watch) is being worn on the wrist, or whether an armband device is being worn on the wearer's arm, among other possibilities.

Examples described herein provide for using IMU sensor outputs observed when the BCT is active to determine on-the-fly detection of the fitting of the wearable computing device while wearers are using the device.

It should be understood that any examples described with reference to a wearable audio device may apply equally to audio devices that are not configured to be wearable, so long as such audio devices can be communicatively coupled (e.g., tethered) to another computing device.

While various aspects and embodiments have been disclosed herein, other aspects and embodiments will be apparent to those skilled in the art. The various aspects and embodiments disclosed herein are for purposes of illustration and are not intended to be limiting, with scope being indicated by the following claims.

What is claimed is:

1. A system, comprising:
   a head-mountable device (HMD) including a bone conduction transducer that transmits an audio signal and an inertial measurement unit (IMU) sensor connected to the bone conduction transducer, wherein the IMU sensor detects movement of the HMD due to vibrations of the bone conduction transducer transmitting the audio signal and the IMU sensor provides outputs; and
   one or more processors that receive the outputs of the IMU sensor and compare the outputs of the IMU sensor with stored reference signals, wherein the stored reference signals are based on the audio signal that is transmitted and include data that is indicative of known IMU outputs due to vibrations of the bone conduction transducer transmitting the audio signal in instances for a variety of measures of contact of the bone conduction transducer with a wearer of the HMD resulting in a variety of HMD fitting parameters, and wherein the one or more processors output an HMD fitting parameter based on the comparison,
   wherein the HMD fitting parameter is related to a fit of a structure of the HMD to a wearer's bone structure.

2. The system of claim 1, wherein the one or more processors further provide an audio notification to the wearer of the HMD regarding the HMD fitting parameter.

3. The system of claim 1, wherein the HMD further includes a display, and the one or more processors provide a visual notification for display on the display of the HMD regarding the HMD fitting parameter.

4. The system of claim 1, wherein the audio signal transmitted by the bone conduction transducer includes a calibration audio signal, and wherein the stored reference signals are indicative of a known IMU sensor output for movement due to vibrations of the bone conduction transducer transmitting the calibration audio signal in an instance for a measure of contact of the bone conduction transducer with the wearer that is above a threshold level, and the one or more processors further:
   match the outputs of the IMU sensor to at least one of the stored reference signals;
   identify a measure of contact of the bone conduction transducer with the wearer corresponding to the matched reference signal; and
   determine the HMD fitting parameter based on the identified measure of contact.

5. The system of claim 1, wherein the audio signal transmitted by the bone conduction transducer includes a calibration audio signal, and wherein the stored reference signals are indicative of a known IMU sensor output for movement due to vibrations of the bone conduction transducer transmitting the calibration audio signal in an instance for a measure of contact of the bone conduction transducer with the wearer that is below a threshold level, and the one or more processors further:
   match the outputs of the IMU sensor to at least one of stored reference signals;
   identify a measure of contact of the bone conduction transducer with the wearer corresponding to the matched reference signal; and
   determine the HMD fitting parameter based on the identified measure of contact.

6. The system of claim 1, wherein the audio signal transmitted by the bone conduction transducer includes a calibration audio signal, and wherein the stored reference signals include reference signal data that is indicative of known IMU sensor outputs for movement due to vibrations of the bone conduction transducer transmitting the calibration audio signal in instances for a variety of measures of contact of the bone conduction transducer with the wearer, and the one or more processors further:
   match the outputs of the IMU sensor to at least one of the stored reference signals;
   identify a measure of contact of the bone conduction transducer with the wearer corresponding to the matched reference signal data; and
   determine the HMD fitting parameter based on the identified measure of contact.

7. The system of claim 1, wherein the IMU sensor detects vibrations of the HMD as the HMD is being worn by the wearer and the bone conduction transducer is transmitting the audio signal, such that the HMD is coupled to the wearer and the IMU sensor detects vibrations of the HMD-wearer coupling.

8. The system of claim 1, wherein the IMU sensor detects movement of the HMD due to vibrations that are representative of a mass, wherein the mass includes the HMD coupled to the wearer, and wherein the vibrations are indicative of a mass having a first size based on the HMD having a first HMD fitting parameter and the vibrations are indicative of a mass having a second size based on the HMD having a second HMD fitting parameter, wherein the first size is larger than the second size and the first HMD fitting parameter is higher than the second HMD fitting parameter.

9. The system of claim 8, wherein the HMD fitting parameter indicates a measure of contact of the bone conduction transducer with a temple of the wearer.

10. The system of claim 8, wherein the HMD fitting parameter indicates a measure of contact of the bone conduction transducer with an ear of the wearer.

11. The system of claim 1, wherein the IMU sensor comprises one or more of an accelerometer and a gyroscope.

12. The system of claim 1, wherein the one or more processors further tune one or more audio parameters of the bone conduction transducer based on the HMD fitting parameter.

13. A system, comprising:
a head-mountable device (HMD) including a bone conduction transducer that transmits an audio signal and an accelerometer connected to the bone conduction transducer, wherein the accelerometer detects movement of the HMD due to vibrations of the bone conduction transducer transmitting the audio signal and the accelerometer provides outputs; and
one or more processors that receive the outputs of the accelerometer and compare the outputs of the accelerometer with stored reference signals, wherein the stored reference signals are based on the audio signal that is transmitted and include data that is indicative of known accelerometer outputs due to vibrations of the bone conduction transducer transmitting the audio signal in instances for a variety of measures of contact of the bone conduction transducer with a wearer of the HMD resulting in a variety of HMD fitting parameters, and wherein the one or more processors output an HMD fitting parameter based on the comparison, wherein the HMD fitting parameter is related to a fit of a structure of the HMD to a wearer's bone structure.

14. The system of claim 13, wherein the indication of the fit of the HMD is determined from among a spectrum of fitting including a poor fit to a tight fit, and wherein the stored reference signals include reference signal data that is indicative of known accelerometer outputs for movement due to vibrations of the bone conduction transducer transmitting the audio signal in instances for a variety of measures of contact of the bone conduction transducer with the wearer resulting in a variety of fittings along the spectrum.

15. The system of claim 13, wherein the one or more processors further tune one or more audio parameters of the bone conduction transducer based on the fit of the HMD to the wearer of the HMD.

16. A method comprising:
transmitting an audio signal via a bone conduction transducer of a head-mountable device (HMD);
detecting movement of the HMD, by an accelerometer connected to the bone conduction transducer, due to vibrations of the bone conduction transducer transmitting the audio signal;
comparing outputs of the accelerometer with stored reference signals, wherein the stored reference signals are based on the audio signal that is transmitted and include data that is indicative of known accelerometer outputs due to vibrations of the bone conduction transducer transmitting the audio signal in instances for a variety of measures of contact of the bone conduction transducer with a wearer of the HMD resulting in a variety of HMD fitting parameters, wherein the HMD fitting parameters are related to a fit of a structure of the HMD to a wearer's bone structure; and
outputting an indication of a fit of the HMD to a wearer of the HMD based on the comparison.

17. The method of claim 16, further comprising:
receiving an input indicating that the fit of the HMD to the wearer is accepted; and
updating the at least one reference signal to refer to the outputs of the accelerometer.

18. The method of claim 16, further comprising:
in response to detecting that the HMD is being worn by the wearer, performing the method of claim 16.

19. The method of claim 16, further comprising:
in response to the indication of the fit of the HMD to the wearer of the HMD being below a threshold level, prompting the wearer to re-fit the HMD.

20. The method of claim 16, further comprising:
based on the fit of the HMD to the wearer of the HMD, tuning one or more audio parameters of the bone conduction transducer.

* * * * *